United States Patent [19]

Hurd

[11] 3,999,806
[45] Dec. 28, 1976

[54] AIR CONVEYOR WITH PASSIVE DIVERT

[75] Inventor: Stanley E. Hurd, Sunnyvale, Calif.

[73] Assignee: The Motch & Merryweather Machinery Company, Hayward, Calif.

[22] Filed: Aug. 11, 1975

[21] Appl. No.: 604,416

Related U.S. Application Data

[63] Continuation of Ser. No. 448,678, March 6, 1974, abandoned.

[52] U.S. Cl. .................................. 302/28; 302/31
[51] Int. Cl.² ........................................ B65G 51/02
[58] Field of Search .................. 302/2 R, 28–31; 193/39; 214/1 BE; 198/31 R, 81

[56] References Cited

UNITED STATES PATENTS

| 1,365,662 | 1/1921 | Covert | 302/22 |
| 2,167,343 | 7/1939 | Bergmann | 198/81 |
| 2,215,702 | 9/1940 | Holm | 198/81 |
| 3,647,266 | 3/1972 | Hurd et al. | 302/31 |
| 3,684,327 | 8/1972 | Hurd | 302/29 |

Primary Examiner—Evon C. Blunk
Assistant Examiner—Jeffrey V. Nase
Attorney, Agent, or Firm—Patrick J. Walsh

[57] ABSTRACT

An air conveyor is disclosed for conveying disc or cup shaped articles. The air conveyor includes a conveying surface comprising a deck plate having propulsion slots extending therethrough for issuing propulsion air jets along the conveyor surface for conveying the articles. The air conveyor is provided with one or more spur or branch conveyor lines which lead from the main conveyor line to subsequent operating stations without requiring any moving parts to carry out the transferring functions.

7 Claims, 4 Drawing Figures

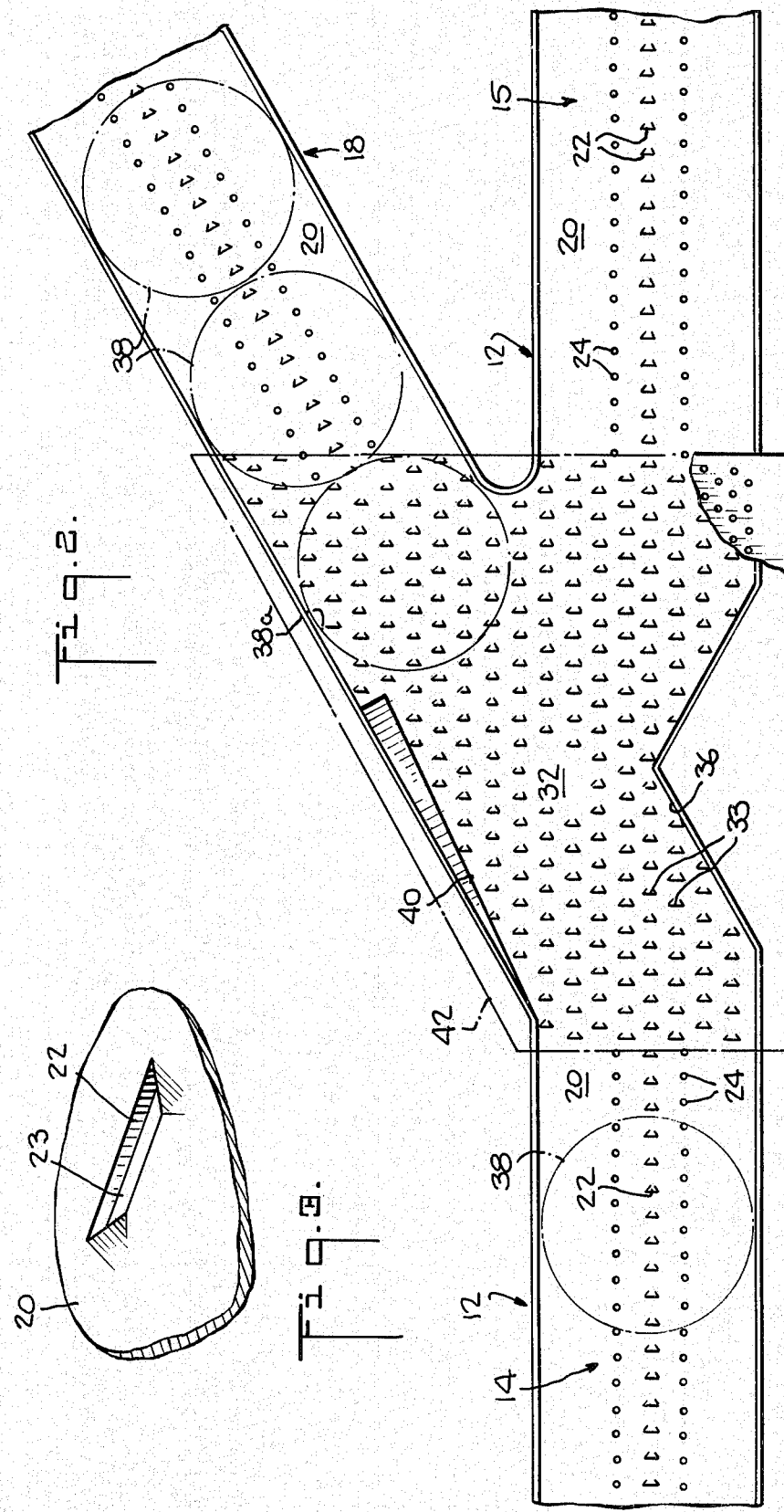

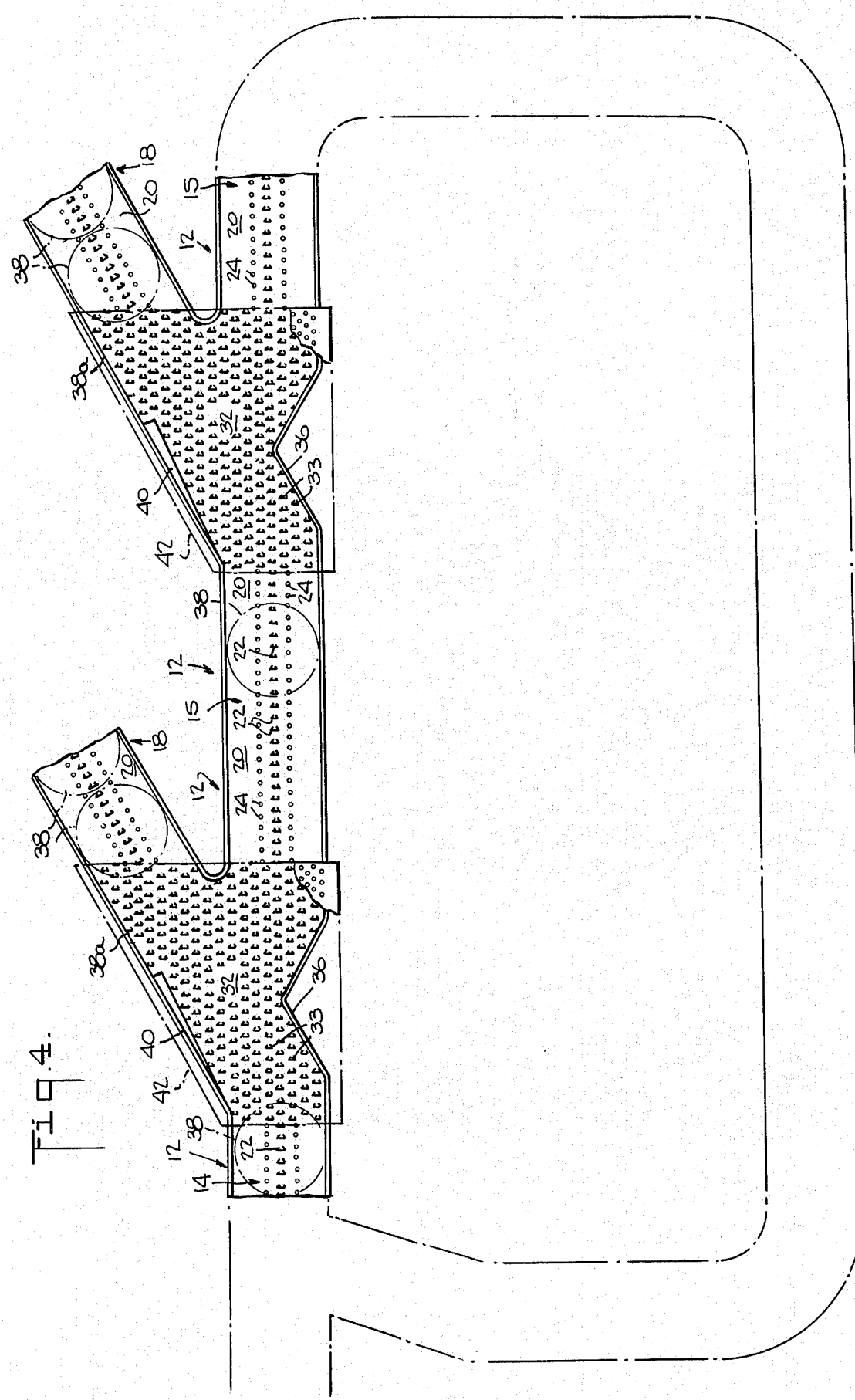

AIR CONVEYOR WITH PASSIVE DIVERT

This is a continuation of application Ser. No. 448,678 filed Mar. 6, 1974, now abandoned.

BACKGROUND OF THE INVENTION

In the production of articles such as oil filter cups or similar articles, several manufacturing operations are performed by different machines necessitating the use of conveyors between such machines. Frequently it is desirable to have a plurality of machines or operating stations operate "in parallel" with each other for performing a working step in the process of manufacturing an article such as an oil filter shell. For example, steel cups are drawn from suitable stock material by a drawing machine and are fed to other machines for subsequent working steps in forming the shells. The drawn cups may be moved over a main conveyor line leading from the drawing machine to one or more shell fabricating machines.

The present invention is directed to an air conveyor having a main conveyor line together with one or more spur conveyor sections to move articles from a source point to two or more fabricating stations located "in parallel" to each other.

The main air conveyor comprises a perforated deck plate having propulsion slots for issuing a plurality of air propulsion jets through the conveyor deck plate for moving articles along the conveyor. The propulsion jets have flow components extending longitudinally of the conveyor surface. The perforated deck may also include one or more rows of lift holes for issuing a plurality of air jets for lifting the conveyed articles off the conveying surface as they are being conveyed. The air conveyor is provided with a plenum chamber beneath the deck plate for delivering air under pressure through the perforated deck plate. The plenum chamber extends along the length of the conveyor supplying air through the entire length of the conveyor. The plenum is closed except for the deck perforations and a fan or blower furnishes air under pressure to the plenum chamber. The air conveyor may be of any configuration; i.e., straight line, curved or both according to a particular plant layout.

According to the present invention, there is provided one or more conveyor spur sections each of which acts as a passive divert for receiving and diverting articles moving along the main conveyor. Under normal operating conditions, the spur sections of the conveyor are first filled with the conveyed articles as conveyor operation begins. After the first spur section is filled, the articles continue along the main conveyor path and enter and fill the next empty spur section. When each spur is filled, then articles will flow along the main conveyor path between inlet and outlet points. If desired, the main conveyor may be endless for circulating articles not diverted to a spur section.

As articles are removed from a spur section, it will be replenished with the next available articles moving along the main conveyor.

Each spur conveyor sections intersects the main conveyor path at an acute angle in the general direction of article flow, so that the spur conveyor section acts as a passive divert making a "Y-shaped" intersection with the main conveyor.

The spur conveyor section includes a junction member placed in the main conveyor path, and having an inlet point and two outlet points: one to the main conveyor path and the other to the spur conveyor section. The junction member has a deflector wall projecting into the path of oncoming articles to deflect the articles to flow along the centerline of the spur conveyor section. Such deflection occurs repeatedly until the spur is filled. Subsequent articles will encounter the deflector plate, however, since the spur is filled, such articles merely carom off the last article in the spur and continue moving along the main conveyor path.

The spur junction member, like the main conveyor section, is an air conveyor having a perforated deck plate having a subjacent plenum chamber which communicates with the plenums serving the upstream and downstream main conveyor sections. It should be noted that the spur junction member has a perforated plate with a different configuration from that of the main conveyor, as more fully explained hereinbelow. The spur conveyor section in turn is an air conveyor having a perforated deck plate and a subjacent plenum.

The entrance to the spur conveyor section is fitted with a spur deflector member to deflect articles to move downstream along the main conveyor path as they leave the spur section.

It is an object of the present invention to provide an air conveyor having a plurality of spur conveyor sections for conveying articles from a source to two or more discharge points.

Another object of the invention is to provide a conveyor system having a main section and plural spur sections in which the spur section closest to the point of origin of conveyed articles functions to divert from the main conveyor path until filled whereupon subsequently flowing articles will flow to and through subsequent spur sections.

A further object of the present invention is to provide divert baffles at each spur junction to achieve smooth article flow through each junction to the spur section or to the main conveyor section.

Other and further objects of the invention will be apparent upon an understanding of the accompanying specification and claims and upon employment of the invention in practice.

A preferred embodiment of the invention has been chosen for purposes of illustrating and describing the invention wherein:

FIG. 2 is a plan view thereof;

FIG. 3 is a fragmentary perspective view of a portion of the main air conveyor; and FIG. 4 is a plan view showing a plurality of spur junctions and a closed loop air conveyor shown in broken lines for continuously circulating articles.

Figure 1:
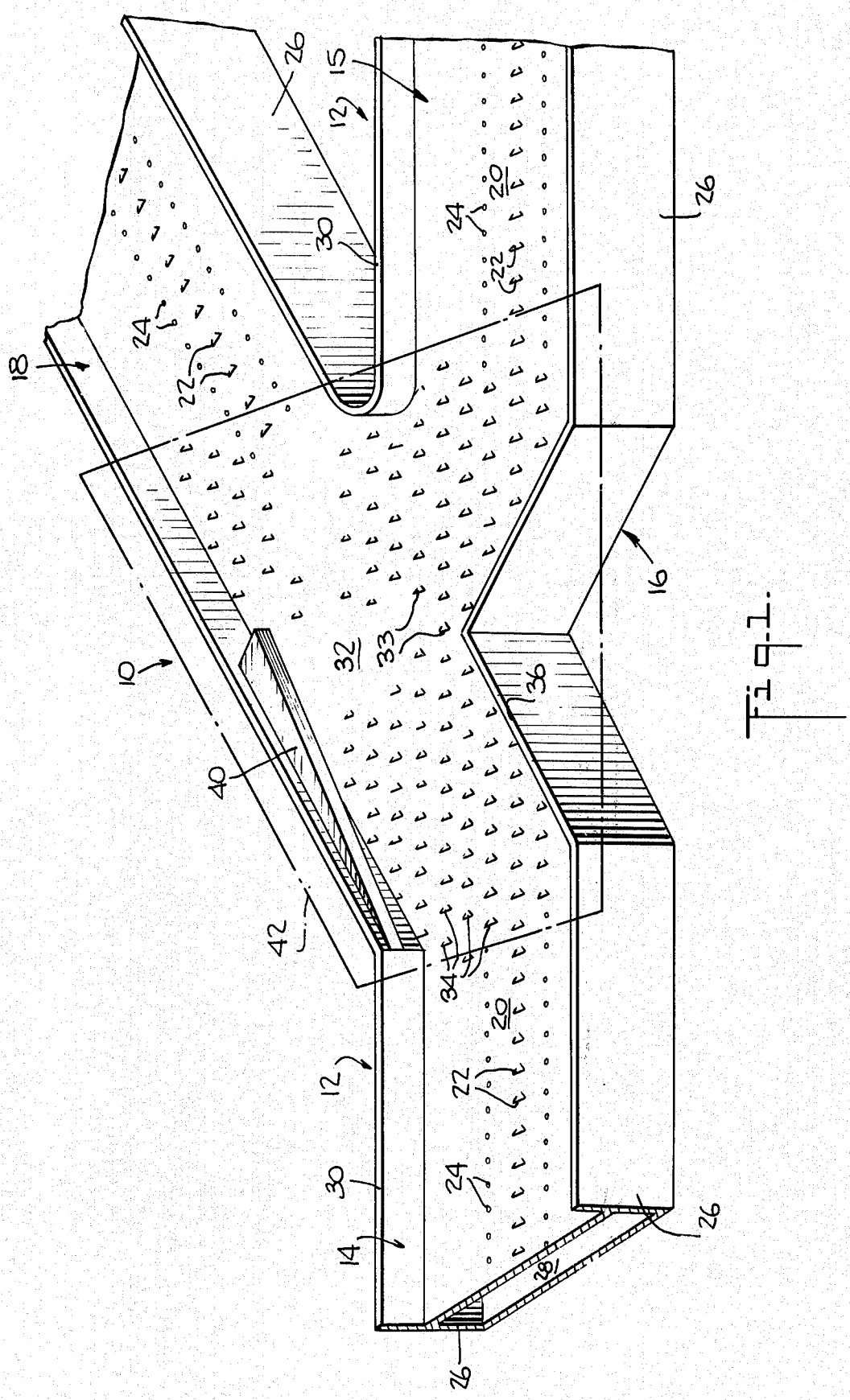
FIG. 1 is a perspective view of an air conveyor according to the invention.

Referring now to the drawings and more particularly to FIG. 1, an air conveyor 10 according to the present invention includes a main conveyor path 12 defined by longitudinally extending spaced conveyor sections 14, 15 separated by a spur junction 16. The spur junction member leads also to a spur section 18. The air conveyor may take several forms. Generally, the air conveyor comprises a plurality of main conveyor sections 14, 15 defining a continuous linear path from a source of articles toward two or more take-off points each of which is served by a spur conveyor section 18. A number of spur junctions 16 are located in the main conveyor according to the number of take-off points desired. The terminal portion of this form of conveyor is the last spur section away from the article source. In a modified form, the spur conveyor may be a closed loop, typically oval-shaped as shown in broken lines in FIG. 4, capable of continuously circulating articles along the main conveyor path until each is diverted onto a spur section. In a closed loop the spur sections preferably lead outwardly from the closed loop to an outlet or discharge point.

The air conveyor sections (including both the main conveyor sections as well as the spur sections) comprise a perforated deck plate 20 over which articles are conveyed. Typically the deck plate is incised with a row of propulsion slots 22 which direct jets of air having substantially horizontal flow components along the surface of the conveyor. If desired, the deck plate may include two or more rows of lift holes 24 arranged in substantially parallel rows on either side of the propulsion slots. An article introduced onto the conveyor is lifted by air jets issuing substantially vertically through the holes. The propulsion slots issue air jets having substantially horizontal flow components which move the article along the conveyor. Some lifting force is developed by the propulsion jets which have an incremetal vertical flow component. As shown in FIG. 3, each propulsion slot is preferably incised into the deck plate 20 to define an aperature 23 through which the air jet flows leaving the surface of the deck plate substantially unobstructed.

Each air conveyor section further includes a plenum chamber 24 defined by spaced side walls 25, a bottom wall 28, and the deck plate 20. The plenum is substantially closed to conserve pressurized air delivered by a fan (not shown). Ordinarily, air within the plenum is pressurized to about 5 inches of water. Actual pressure may be selected according to article configuration, conveying rates, etc. Guide rails 30 may be used to define the marginal edges of the conveyor.

Each diversion point of the air conveyor is fitted with a generally Y-shaped spur junction 16 defining a first conveyor path connecting spaced main conveyor sections 14, 15. The spur junction defines a second path between main conveyor section 14 and the spur conveyor section 18. The spur junction includes a deck plate 32 having a plurality of propulsion slots 33 incised therein and arranged in rows 34 lying substantially parallel to the longitudinal centerline of the main conveyor sections. This deck plate need not be fitted with lift holes. The spur junction is further provided with a plenum which communicates with the plenum chambers of the spaced main conveyor sections and the spur section. Air jets issuing through the spur junction slots have flow components substantially parallel to the main conveyor centerline. As best shown in FIGS. 1 and 2, the spur junction is provided with a deflector plate 36 projecting into the path of articles 38 moving along the main conveyor section. Articles are deflected by the plate to move in the direction of the spur conveyor section 18. The air jets issuing through the spur junction deck plate are effective to move the article onto the spur conveyor 18, which in turn issues air jets through slots to continue the articles along the spur conveyor. Articles moving along the main conveyor section are therefore normally deflected to move onto the spur section and will do so as long as the spur conveyor has capacity to receive the articles.

When the spur conveyor is filled to capacity, subsequent articles cannot enter, and they therefore are again deflected to continue moving along the main conveyor line. The article is deflected as it caroms off the rearmost article in the spur conveyor section. A spur deflector bar 40 is located on the side wall of the spur junction to assist an article carom off the rearmost article. The spur deflector bar prevents build up of additional articles in the spur junction which build up would tend to jam the conveyor. It is important to note that the size of the spur conveyor must be selected so that the position of the rearmost article 38a lies in the approximate position of FIG. 2. The rearmost article lies at the entrance of the spur section so that subsequent articles may carom off the rearmost article and move onto the main conveyor section without stalling or jamming. The spur deflector 40 guides subsequent articles to carom off the rearmost article in a direction to reenter the main conveyor path.

It is to be observed that the spur conveyor forms a preferred angle of 30° with the centerline of the main conveyor. The deflector plate projects at the same angle as the spur conveyor. While a 30° angle is preferred, other angles may be used from 0° to 90° with angles from about 20° to about 70° being the preferred range.

Preferably, a perforated cover 42 overlies the spur junction to prevent articles leaving the conveyor at the spur junction.

The operation of the air conveyor is apparent from the foregoing description; however, for convenience is stated here. An article, such as an oil filter cup preform 38, moves along the main conveyor path 14 en route from the conveyor inlet to outlet. Upon encountering the deflector plate 36, the cup preform is diverted to move in the direction of and enter the spur conveyor 18 if the spur conveyor is not filled to capacity. If so filled, the cup preform caroms off the rearmost cup 38a located at the entrance to the spur conveyor thereby to reenter the main conveyor path 15. The spur deflector 40 guides the cup preform to engage the rearmost article 38a in a manner to be deflected forwardly and not to "hang up" at the spur junction.

What is claimed is:
1. An air conveyor comprising:
   a. first air conveyor means defining a first conveying path, first and second sidewalls for confining articles to the first path,
   b. second air conveyor means defining a second conveying path lying along a centerline intersecting the first path at an acute angle, first and second sidewalls for confining articles to said second conveying path,
   c. third air conveyor means defining a spur junction having (i) an entrance section connected to said first air conveyor means, (ii) an intermediate section lying along an extension of the centerline of the second air conveyor means, (iii) a first exit section joined to the second air conveyor means defining a continuous air conveying surface between the first and second paths,
   said spur junction having a first sidewall joined at opposite ends to the first sidewalls of each of said first and second air conveying means thereby defining a continuous sidewall from the first path to the second path,
   said spur junction having a second upstanding sidewall joined at the entrance section to the second sidewall of said first air conveyor means to define a continuous sidewall from the first path to the second path, said spur junction second sidewall being oriented in spaced relation and generally parallel to the aforesaid extension of the second path centerline so that articles are deflected by said spur junction second sidewall to move along said second path, a gap between the spur junction second sidewall and the second sidewall of said second air conveyor means defining a second exit from said spur junction, d. fourth air conveyor means communicating with said spur junction through said second exit for receiving and conveying articles away from said spur junction, and deflector means mounted on the first spur junction sidewall opposite said gap for deflecting articles from the spur junction through said gap to the fourth air conveyor means when the second path is filled to capacity.

2. An air conveyor as defined in claim 1 in which the acute angle is approximately 30°.

3. An air conveyor as defined in claim 1 which defines a closed loop and includes a plurality of spur junctions and a plurality of second air conveying means disposed along said loop.

4. An air conveyor as defined in claim 1 which defines a closed loop for continuously circulating articles thereon until diverted onto a second air conveying means.

5. An air conveyor as defined in claim 4 in which each second air conveying means leads outwardly from the closed loop.

6. An air conveyor as defined in claim 1 which further includes a perforated cover overlying the spur junction.

7. An air conveyor as defined in claim 1 in which the acute angle is in the range of 20° to 70°.

* * * * *